L. ATWOOD.
MACHINE FOR CUTTING FRICTION FABRICS.
APPLICATION FILED MAY 12, 1908.
933,688.
Patented Sept. 7, 1909.
5 SHEETS—SHEET 1.
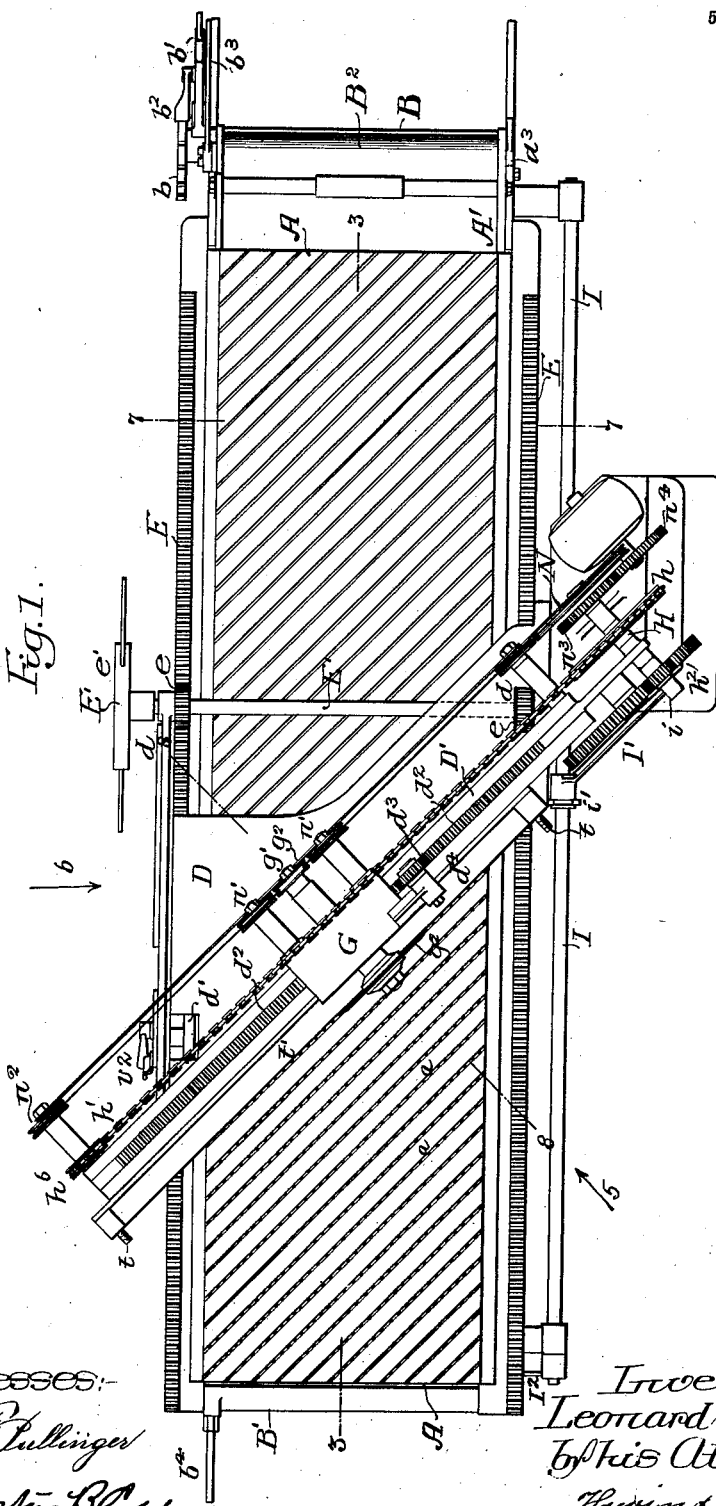
Witnesses:
Inventor
Leonard Atwood.
by his Attorneys,
Howsen & Howsen L. ATWOOD.
MACHINE FOR CUTTING FRICTION FABRICS.
APPLICATION FILED MAY 12, 1908.
933,688.
Patented Sept. 7, 1909.
5 SHEETS—SHEET 2.
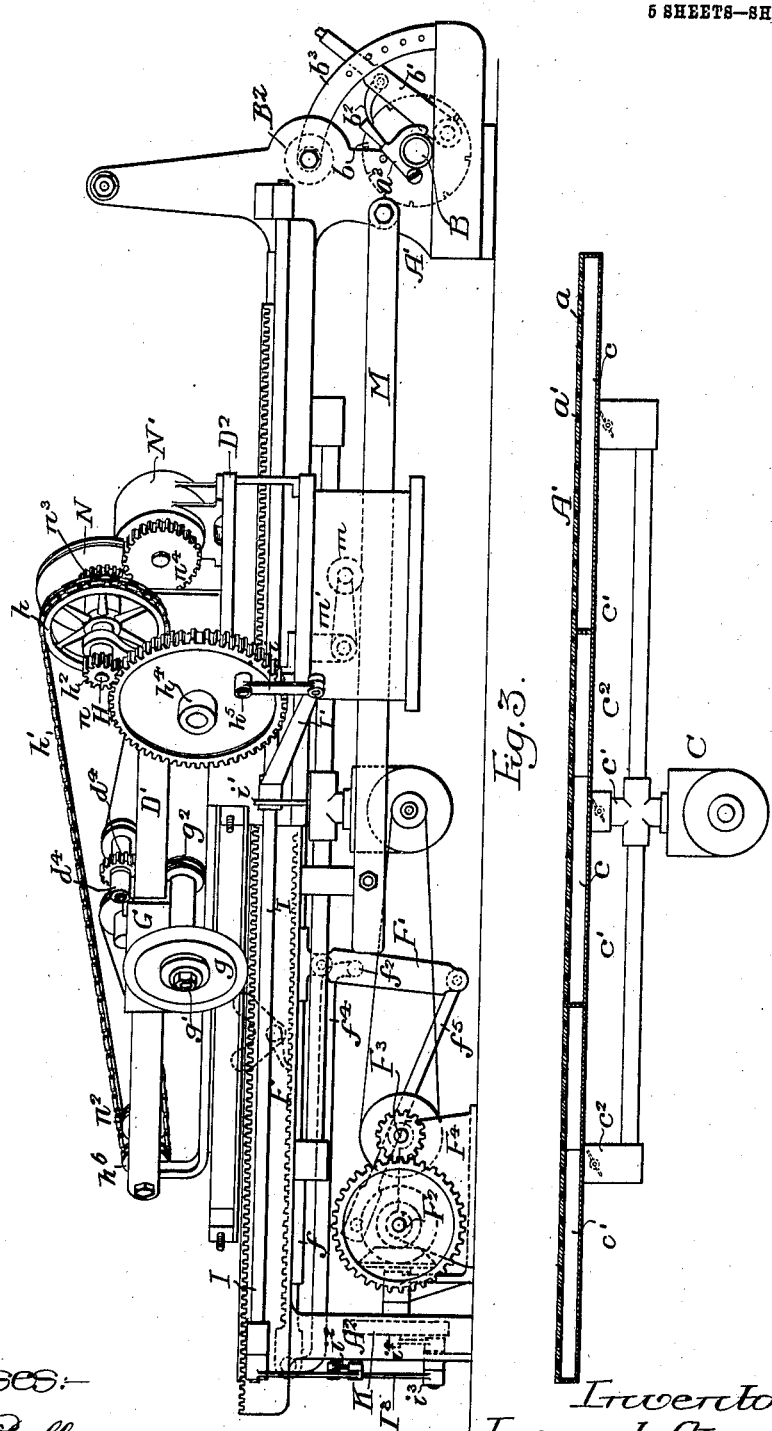

L. ATWOOD.
MACHINE FOR CUTTING FRICTION FABRICS.
APPLICATION FILED MAY 12, 1908.
933,688.
Patented Sept. 7, 1909.
5 SHEETS—SHEET 3.
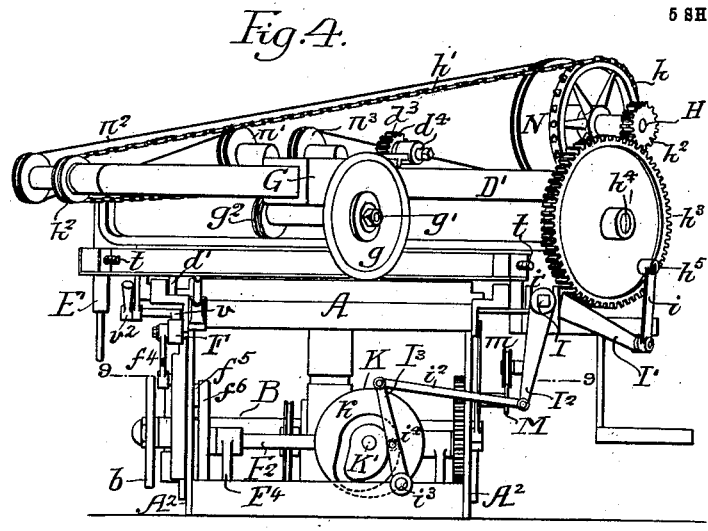
Fig. 4.
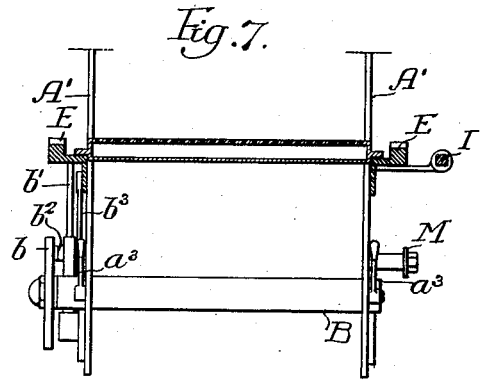
Fig. 7.
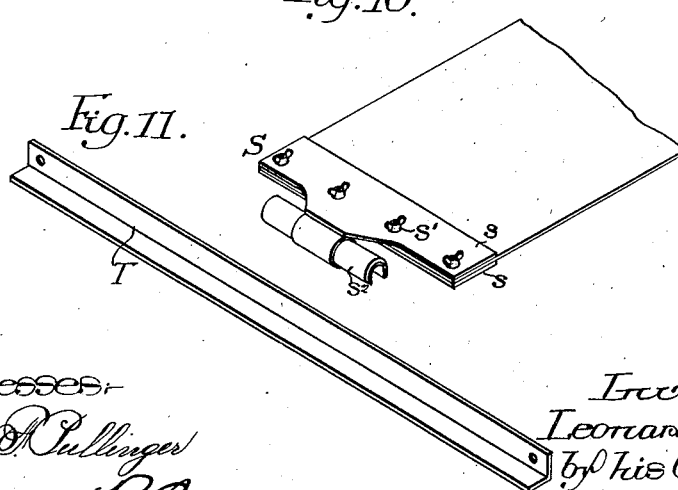
Fig. 10.
Fig. 11.
Witnesses:
Inventor
Leonard Atwood.
by his Attorneys,

L. ATWOOD.
MACHINE FOR CUTTING FRICTION FABRICS.
APPLICATION FILED MAY 12, 1908.

933,688.

Patented Sept. 7, 1909.

5 SHEETS—SHEET 4.

Witnesses:—
Walter P. Pullinger
Augustus B. Coppes

Inventor
Leonard Atwood
by his Attorneys,
Howson & Howson

L. ATWOOD.
MACHINE FOR CUTTING FRICTION FABRICS.
APPLICATION FILED MAY 12, 1908.

933,688.

Patented Sept. 7, 1909.
5 SHEETS—SHEET 5.

Witnesses:-
Walker R. Pullinger
Augustus B. Coppes

Inventor
Leonard Atwood.
by his Attorneys
Howson & Howson

UNITED STATES PATENT OFFICE.

LEONARD ATWOOD, OF PHILADELPHIA, PENNSYLVANIA, ASSIGNOR OF ONE-THIRD TO ALBERT H. GILLARD, OF BROOKLYN, NEW YORK.

MACHINE FOR CUTTING FRICTION FABRICS.

933,688.     Specification of Letters Patent.     Patented Sept. 7, 1909.

Application filed May 12, 1908. Serial No. 432,532.

*To all whom it may concern:*

Be it known that I, LEONARD ATWOOD, a citizen of the United States, residing in Philadelphia, Pennsylvania, have invented certain Improvements in Machines for Cutting Friction Fabrics, of which the following is a specification.

My invention relates to certain improvements in machines for cutting what is known as "friction fabric," that is, a fabric having a plastic substance applied to one or both sides thereof and adapted for use in the manufacture of rubber hose, pipes or belting. It will be understood that the machine may be used for cutting fabrics coated with other material than rubber having a sticky or adhesive nature.

Owing to the adhesive qualities of the mixture employed to coat the fabric it is extremely difficult to handle or cut the fabric after friction has been applied, and difficult and, sometimes, impossible to pass the material between rolls, and any substance of a neutralizing nature coming in contact with the surface of the fabric, after the same has been coated or frictioned, will destroy the adhesive qualities and produce a defective product.

The object of my invention is to construct a machine which can be driven by power and which will cut the friction fabric in strips on a bias, as fully described hereafter, reference being had to the accompanying drawings, in which:—

Figure 5:
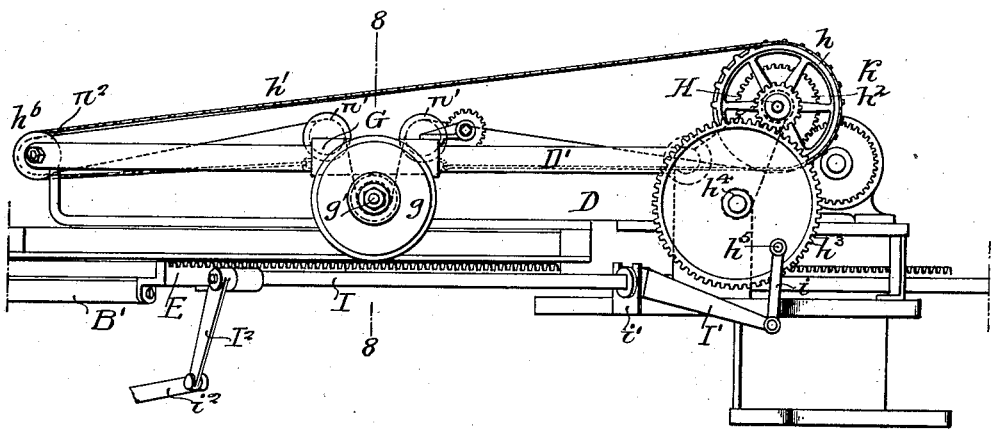
Figure 6:
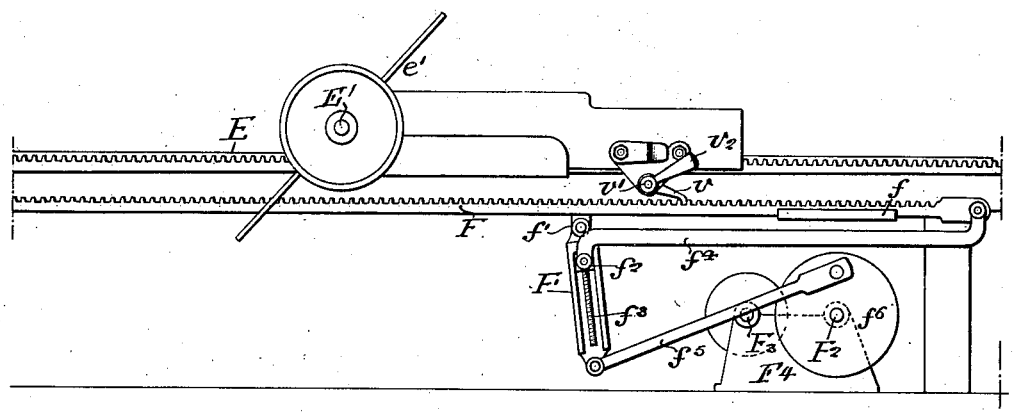
Figure 8:
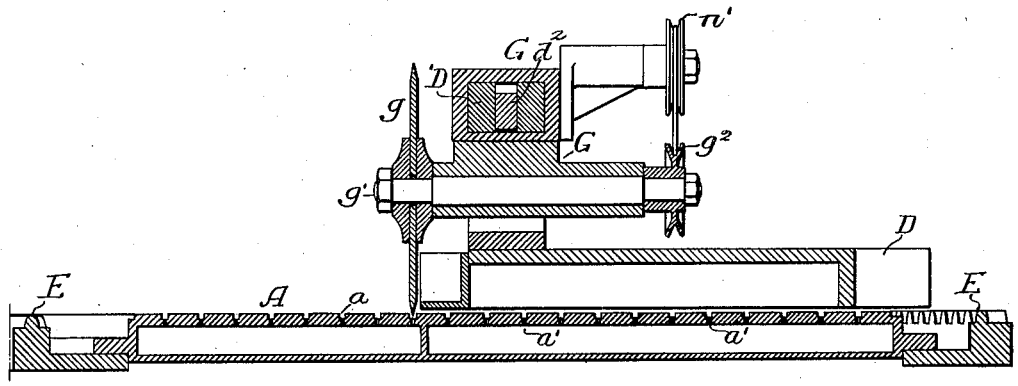
Figure 9:
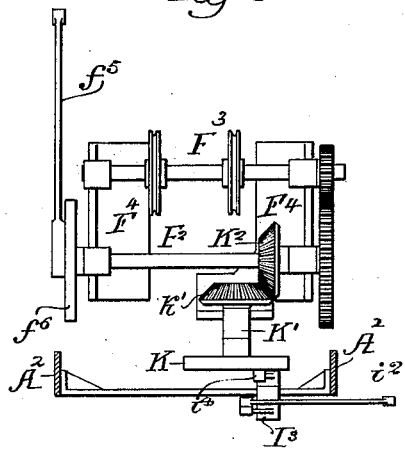

Figure 1, is a plan view of my improved cloth cutting machine; Fig. 2, is a side view; Fig. 3, is a longitudinal sectional view of the table on the line 3—3, Fig. 1; Fig. 4, is an end view; Fig. 5, is a side view of the carriage looking in the direction of the arrow 5, Fig. 1; Fig. 6, is a side view of the table looking in the direction of the arrow 6, Fig. 1; Fig. 7, is a transverse sectional view on the line 7—7, Fig. 1; Fig. 8, is an enlarged sectional view of part of the table and carriage on the line 8—8, Figs. 1 and 5; Fig. 9, is a sectional view on the line 9—9, Fig. 4; and Figs. 10 and 11, are perspective views of different forms of clamps for securing the friction cloth to the carriage.

A is the table of the machine mounted on suitable standards A', A², and any number of intervening supports as desired. This table is hollow, as shown in Figs. 3 and 8, and is preferably divided into three or more sections and has a series of diagonal grooves $a$ in its face spaced a given distance apart, according to the thickness of the friction cloth to be cut. The table has a series of perforations $a'$ forming communication between the space under the table and the grooves, so that air can be drawn through the openings to create a suction and the cloth will be held to the plate by suction.

C is an air suction pump, in the present instance communicating through pipes $c'$ with the three compartments $c$. This pump can be driven by any suitable mechanism other than the mechanism for traversing the carriage.

The friction cloth is wound upon the drum B detachably mounted in bearings $a^2$ in the end of the standard A' and is held in place by clamps $a^3$, but any form of detachable bearing may be used without departing from my invention. On the spindle of the drum is a ratchet wheel $b$ and pivoted to the standard is a lever $b'$ having a bar $b^2$ which engages the ratchet wheel.

$b^3$ is a segment having a series of perforations; in any one of these perforations a pin can be placed to limit the movement of the ratchet wheel. By this means the cloth is kept in a taut condition; the cloth being held at the opposite end by an eccentrically mounted bearing having a handle $b^4$.

D is the carriage carrying the cutter and this carriage is mounted to travel over the table A; being supported in the present instance by the two gear wheels $e, e$ and a plain wheel $d'$ adapted to run in the ways between the table proper and the rack E. The table may be supported by other means if desired.

On each side of the table are longitudinal racks E, E with which engage the pinions $e, e$. These pinions are mounted on the shaft E' adapted to bearings $d, d$ on the table.

$e'$ is a hand wheel by which the shaft E' can be turned so as to traverse the carriage over the table by hand.

Adapted to guides $f, f$ on one side of the table is a rack bar F having teeth which are engaged by a pawl $v$ pivoted at $v'$ to a bracket on the carriage.

$v^2$ is a handle for operating the bar to turn it either into or out of engagement with the toothed bar, Fig. 6. Means are connected to the rack bar F to give it a reciprocating motion so as to feed the carriage forward to bring it in line with the grooves in the table one after another to allow the cutter to cut the cloth diagonally in strips.

The mechanism for giving the bar F a reciprocating motion consists, in the present instance, of a lever F' pivoted at $f'$ to the table, and mounted in the lever is an adjustable block $f^2$ actuated by a screw $f^3$, and this block is connected to the bar F by a link $f^4$, Fig. 6. On adjusting the screw the block can be moved so as to increase or diminish the length of the stroke of the bar. The lower end of the lever F' is connected by a rod $f^5$ to a disk $f^6$ on a shaft $F^2$ geared to the power shaft F, which may be driven by an independent motor or from the main shaft, as desired. The shafts $F^2$, $F^3$ are mounted in suitable bearings in a frame $F^4$ secured to the floor or to the main frame, as desired.

Mounted on the carriage D is a slide G carrying the spindle $g'$ on which is mounted the rotary cutter $g$. The slide G is adapted to rails D' on the carriage and between the rails in the present instance is a rack $d^2$ with which meshes a pinion $d^3$ on a shaft $d^4$ mounted in a bearing on the slide. The end of this shaft is shaped so as to receive a handle by which it can be turned. By this means the slide can be moved by hand to any position desired on the carriage.

In order to reciprocate the slide over the surface of the table, I mount a sprocket wheel $h$ on a shaft H at one end of the carriage, and pass around this sprocket wheel a chain $h'$ which extends around a wheel $h^6$ at the opposite side of the carriage; one end of the chain is fastened to one side of the slide G and the other end of the chain is fastened to the other side of the slide.

On the shaft H is a pinion $h^2$ which meshes with a wheel $h^3$ mounted on a stud $h^4$ on the carriage, and this wheel has a crank pin $h^5$ which is connected to an arm I' on a shaft I through a connecting rod $i$. The shaft I is a square shaft in the present instance and the arm I' is shaped to conform to the shaft so that it will turn with the shaft but is free to slide with the carriage upon the shaft, being confined laterally to the carriage in the present instance by a bracket $i'$ adapted to a groove in its hub.

Attached to the end of the shaft I in the present instance is an arm $I^2$ connected to the lever $I^3$ by a rod $i^2$; the lever being pivoted at $i^3$ to the base of the machine. The lever $I^3$ has a pin $i^4$ which enters a cam groove $k$ in a disk K mounted on a shaft K', Figs. 4 and 9; and on the inner end of this shaft is a beveled gear wheel $k'$ which meshes with a beveled gear $K^2$ on the shaft $F^2$, so that as the shaft $F^2$ rotates, the shaft K will rotate with it and consequently reciprocate the lever $I^3$, which in turn will reciprocate the shaft I and cause partial rotation of the gear wheel $h^3$ on the carriage.

The mechanism for rotating the cutter $g$ consists, in the present instance, of a rope drive; the rope $n$ passing around a driving wheel N at one side of the carriage, around the wheels $n'$ on the slide G, and around the wheel $g^2$ on the spindle $g'$ carrying the cutter. The rope then passes around a sheave $n^2$ at the opposite end of the machine and returns to the driving wheel N. Mounted on the hub of this wheel N is a pinion $n^3$ which meshes with a gear wheel $n^4$ on the shaft of an electric motor N'. This electric motor is mounted on a platform $D^2$ projecting from the carriage D, so that as the carriage is reciprocated the cutter is driven rapidly independently of the movement of the carriage and in no matter what position the carriage is in the driving mechanism of the cutter will always be in gear.

I preferably secure to one side of the table a bar M acting as the electrical conductor and adapted to travel on this bar is a trolley wheel $m$ mounted on an arm $m'$ pivoted to the carriage. The wires extend from the trolley to the motor and as the carriage moves over the table the trolley will travel on the bar M. This bar can be insulated in any suitable manner so as to protect the workmen.

The perforated table is preferably made with a zinc face as I find that this is the best material for the purpose, and the zinc face can be secured to the body of the table in any suitable manner. The perforations in the table communicating with the several compartments are arranged on a line with the grooves in the face of the table and the pipes leading to the several compartments of the table are provided with valves $c^2$, so that on turning any one of the valves that section of the table can be cut off from the suction pump. I preferably make the suction pump in such a manner that it can be reversed to cause a blast of air to be forced through the openings in the table when it is desired to clear the openings or to aid in removing the friction cloth from the table.

When the friction cloth is first applied to the table I preferably use a clamp such as is illustrated in Fig. 10, consisting of two plates $s$, $s$ clamped on each side of the end of the cloth and secured together by bolts $s'$. One of these plates has a hooked member $s^2$ adapted to engage the shaft E' on the carriage, so that when the carriage is moved back the clamp S can be hooked on to the shaft E' of the carriage and then the carriage can be driven forward, either by power or by hand, unrolling the friction cloth over the bed and then it is drawn over by hand and clamped by the eccentric clamp bar B'; the clamp S being first removed from the fabric. After the fabric is cut on the bias by the cutters and it is desired to move it forward, then a clamp bar, such as that illustrated in Fig. 11, is used; the bar T being mounted on the studs $t$, $t$, Fig. 1, on the front of the carriage and the cloth is clamped between the edge $t'$ of the carriage and the bar T, so that when the carriage is moved forward it will unroll the fabric, drawing it over the table in position to be cut.

The operation of the machine is as follows:—The friction cloth is wound around the mandrel B and the clamp S, Fig. 10, is secured to the cloth and the cloth passed over a roller $B^2$ and the clamp hooked onto the shaft E' of the carriage. The carriage is then moved forward unrolling the friction cloth, drawing it over the table until the carriage reaches the end of its forward movement, when the clamp S is detached from the end of the cloth while the cloth is drawn out and is fastened by an eccentric clamp bar B'. After the cloth is firmly secured to the table the valves of the air suction pipes are opened and the suction pump operated so as to draw the fabric firmly onto the table; the carriage being then at its extreme forward position the mechanism for intermittently moving the carriage is operated, as well as the mechanism for reciprocating the slide and rotating the cutter. The carriage moves intermittently back and forth over the fabric and the cutter between every intermittent motion cuts a strip from the body of the fabric until the carriage is at the opposite end of the machine, then the fabric is attached to the carriage by means of the clamp bar T, shown in Fig. 11, when the cloth is again drawn out over the table and the cutting operation repeated.

I claim:—

1. The combination in a machine for cutting cloth, of a table having a series of perforations therein, means for producing a suction communicating with the perforations in the table, so as to hold the cloth to the table, a carriage arranged to travel on the table, diagonal guides on the carriage and a cutter adapted to the diagonal guides on the carriage so that on the reciprocation of the cutter and the movement of the carriage, the cloth will be cut into strips on diagonal lines.

2. The combination in a machine for cutting friction cloth, of a table having grooves extending diagonally across the table, a series of openings in the table, means for producing a suction communicating with the perforations in the table so as to hold the cloth to the table, a carriage arranged to travel over the table, and a cutter on the carriage for cutting the fabric on the line of the grooves in the table.

3. The combination in a machine for cutting friction cloth, of a table having grooves arranged diagonally to the longitudinal line of the table, a series of openings communicating with the base of the grooves, a suction box under the table communicating with the openings, means for creating a suction in said box, a carriage adapted to travel over the table, rails on the carriage arranged on the same line as the diagonal grooves on the table, and a cutter mounted to travel on the rails to cut the cloth in line with the grooves.

4. The combination in a machine for cutting cloth, of a table having diagonal openings, perforations in the table, a suction box under the table communicating with the perforations so as to hold the cloth down onto the table by suction, a carriage arranged to travel longitudinally over the table, rails arranged diagonally on the carriage, a slide mounted on the rails, means for reciprocating the slide, a rotary cutter carried by the slide arranged to cut the cloth on the line of the grooves of the table, and means for driving the cutter independently of the reciprocating means.

5. The combination of a table having a series of diagonal grooves in the face thereof, a series of perforations in the table, a suction box under the table, a carriage adapted to travel over the table, means for intermittently moving the carriage forward, rails on the carriage, a slide on the rails, means for reciprocating the slide, and a cutter carried by the slide, with means for driving the cutter.

6. The combination of a table on which cloth can be mounted, a carriage adapted to travel on the table, rails on the carrier and arranged diagonally in respect to the longitudinal line of the table, a slide on the rails, a cutter carried by the slide, means for driving the cutter, means for reciprocating the slide, and means for intermittently moving the carriage.

7. The combination of a table, a carriage mounted on the table, the edge of the carriage being arranged diagonally in respect to the longitudinal line of the table, rails on the carriage running parallel to the edge of the carriage, a slide on the rails, means for reciprocating the slide from side to side, a spindle on the slide, a rotary cutter carried by the spindle and situated to travel along the diagonal edge of the carriage, means for driving the spindle independently of the reciprocating mechanism, and means for moving the carriage intermittently over the table.

8. The combination of a table having a series of diagonal grooves therein, perforations in the table communicating with the grooves, a suction box under the table, diagonal partitions in the suction box, a suction pump, pipes communicating with each section of the suction box, and valves in the pipes for regulating the flow of air through the sections of the box.

9. The combination of a table, a carriage adapted to travel over the table, a cutter on the carriage, means for rotating the cutter, a toothed bar at the side of the table, means for reciprocating said bar, a dog pivoted to the carriage adapted to engage the teeth of the bar so that on the reciprocation of the bar the carriage will be moved forward intermittently.

10. The combination of a table, a carriage mounted on the table, a cutter mounted on the carriage, means for operating the cutter, a toothed reciprocating bar at the side of the table, a dog pivoted to the carriage and engaging the teeth of the bar, a lever pivoted to the table, means for operating the lever, a block adjustable toward and from the fulcrum of the lever, and a rod connecting the block with the reciprocating toothed bar.

11. The combination in a table, of a carriage mounted on the table, means for traversing the carriage over the table, a longitudinal shaft at one side of the table, means for rocking said shaft, an arm mounted on the shaft arranged to turn with but slide upon the shaft, a slide on the carriage, a cutter on the slide, a drive chain connected to the carriage passing around a driven wheel, and gearing between the arm on the rock shaft and the driven wheel, whereby on the rocking of the said shaft the slide will be moved from one side of the table to the other.

12. The combination of a table, a carriage mounted on the table, a slide on the carriage adapted to be reciprocated from one side of the table to the other, a cutter on the slide, means for rotating the cutter, a rock shaft on one side of the table, an arm arranged to travel with the carriage and to turn with the rock shaft, a gear wheel, a rod having a crank pin, a chain connected to each end of the slide, a sprocket wheel over which the chain passes, said sprocket wheel being geared to the said gear wheel, driving mechanism, a cam, a lever actuated by the cam, and an arm on the rock shaft connected to the said lever so that on the rotation of the cam the shaft will be rocked and the slide will be reciprocated on the carriage.

13. The combination in a machine for cutting friction cloth, of a diagonally slotted table, a series of perforations in the table communicating with the slots, a suction box under the table communicating with the perforations, a carriage adapted to travel over the table, means for intermittently moving the carriage forward, racks at each side of the table, a transverse shaft mounted on the carriage, pinions on the shaft meshing with the racks so that the carriage can be moved by hand, rails on the carriage running parallel with the slots in the table, a slide adapted to the rails, means for reciprocating the slide, a spindle, a rotary cutter on the spindle, and means for driving the cutter.

14. The combination in a machine for cutting friction cloth, of a table, said table having grooves in the surface thereof and perforated, a suction box under the table communicating with the perforations, a drum at one end of the table upon which the friction cloth is wound, a clamp adapted to be secured to the end of the cloth, and a hook on the clamp engaging the cloth so that when the clamp is hooked onto the carriage and the carriage operated it will unroll the friction cloth and carry it over the table.

15. The combination in a machine for cutting friction cloth diagonally, of a table, a series of diagonal grooves in the surface thereof, perforations in the table communicating mechanism under the table communicating with the said grooves, a carriage, one edge of the carriage alining with the grooves, a cutter adapted to travel along this edge of the carriage, means for driving the cutter, a clamp bar, and means for clamping the said bar along the edge of the carriage so that when it is desired to unwind additional cloth the diagonal edge is clamped to the carriage and the carriage moved forward.

In testimony whereof, I have signed my name to this specification, in the presence of two subscribing witnesses.

LEONARD ATWOOD.

Witnesses:
 WALTER F. PULLINGER,
 WM. A. BARR.